United States Patent
Wang et al.

(10) Patent No.: US 11,296,363 B2
(45) Date of Patent: Apr. 5, 2022

(54) MULTI-CELL BATTERY PACK

(71) Applicant: Apple Inc., Cupertino, CA (US)

(72) Inventors: Dapeng Wang, San Jose, CA (US);
Jinjun Shi, San Jose, CA (US);
Norberto N. Ison, Livermore, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 16/577,476

(22) Filed: Sep. 20, 2019

(65) Prior Publication Data
US 2021/0091420 A1   Mar. 25, 2021

(51) Int. Cl.
*H01M 10/42*   (2006.01)
*H01M 10/44*   (2006.01)
*H02J 7/00*   (2006.01)
*H01M 10/48*   (2006.01)

(52) U.S. Cl.
CPC ..... *H01M 10/4257* (2013.01); *H01M 10/441* (2013.01); *H01M 10/48* (2013.01); *H02J 7/0021* (2013.01); *H01M 2010/4271* (2013.01); *H01M 2220/30* (2013.01)

(58) Field of Classification Search
USPC .......................................................... 320/134
See application file for complete search history.

(56) References Cited

U.S. PATENT DOCUMENTS

| | | | | |
|---|---|---|---|---|
| 2005/0099155 | A1* | 5/2005 | Okuda | F02N 11/0866 320/107 |
| 2009/0284224 | A1* | 11/2009 | Miyazaki | B60L 58/21 320/118 |
| 2010/0244847 | A1* | 9/2010 | Kudo | B60L 58/12 324/433 |
| 2021/0091420 | A1* | 3/2021 | Wang | H01M 10/48 |

* cited by examiner

*Primary Examiner* — Mohammed Alam
(74) *Attorney, Agent, or Firm* — Kilpatrick Townsend & Stockton LLP

(57) ABSTRACT

Battery packs according to embodiments of the present technology may include a first battery cell including a lithium-containing material. The first battery cell may be configured to operate in a voltage window extending to or above about 4 V. The battery packs may include a second battery cell electrically coupled in parallel with the first battery cell. The second battery cell may be configured to operate in a voltage window maintained at or below about 4.0 V. The battery packs may also include a controller configured to receive a measured terminal voltage from the first battery cell. The controller may be configured to determine whether to disconnect the second battery cell from the first battery cell based on the measured terminal voltage of the first battery cell.

17 Claims, 3 Drawing Sheets

MULTI-CELL BATTERY PACK

TECHNICAL FIELD

The present technology relates to batteries. More specifically, the present technology relates to battery cell configurations.

BACKGROUND

Batteries are used in many devices. As electronic devices and applications continue to scale with power requirements, battery cell materials may affect the capacity and operational time between charging.

SUMMARY

Battery packs according to embodiments of the present technology may include a first battery cell including a lithium-containing material. The first battery cell may be configured to operate in a voltage window extending to or above about 4 V. The battery packs may include a second battery cell electrically coupled in parallel with the first battery cell. The second battery cell may be configured to operate in a voltage window maintained at or below about 4.0 V. The battery packs may also include a controller configured to receive a measured terminal voltage from the first battery cell. The controller may be configured to determine whether to disconnect the second battery cell from the first battery cell based on the measured terminal voltage of the first battery cell.

In some embodiments, the first battery cell may be characterized by a cathode electrode density greater than or about 3.85 g/cc. The first battery cell may include a cathode electrode material comprising cobalt. The second battery cell may be characterized by a capacity of less than or about 25% of a capacity of the first battery cell. The second battery cell may be configured to operate in a voltage window maintained between about 2.6 V and about 4.0 V. The second battery cell may include a lithium-containing cathode material including one or more of iron, nickel, or manganese. The second battery cell may include a lithium iron phosphate cathode electrode material. The second battery cell may include an anode material including graphite, titanium, or silicon. The controller may be configured monitor the measured terminal voltage from the first battery cell during charging. The controller may be configured to disconnect the second battery cell from the first battery cell when the measured terminal voltage from the first battery cell exceeds a voltage threshold of the second battery cell. The controller may be configured to electrically connect the second battery cell with the first battery cell during discharging operations. The controller may be configured to connect the second battery cell with the first battery cell during discharging operations when the measured terminal voltage of the first battery cell is lower than or about a voltage threshold of the first battery cell.

Some embodiments of the present technology may encompass battery packs. The battery packs may include a first battery cell including a lithium-cobalt cathode material. The first battery cell may be electrically coupled with an output terminal of the battery pack. The battery packs may also include a second battery cell electrically coupled in parallel with the first battery cell. The second battery cell may include a cathode material different from the first battery cell. The second battery cell may be characterized by a capacity less than or about 50% of the first battery cell. The battery packs may also include a controller configured to receive a measured terminal voltage from the first battery cell during charging operations. The controller may also be configured to electrically disconnect the second battery cell from the first battery cell when the measured terminal voltage from the first battery cell exceeds a voltage threshold of the second battery cell.

In some embodiments the first battery cell may be configured to operate in a voltage window extending between about 2.8 V and about 4.5 V. The second battery cell may be configured to operate in a voltage window extending between about 2.6 V and about 4.0 V. The second battery cell may include a lithium-containing cathode material including one or more of iron, nickel, or manganese. The controller may be configured to electrically connect the second battery cell with the first battery cell during discharging operations. The controller may be configured to connect the second battery cell with the first battery cell during discharging operations when the measured terminal voltage of the first battery cell may be lower than or about a voltage threshold of the first battery cell.

Some embodiments of the present technology may encompass battery packs. The battery packs may include one or more output terminals. The battery packs may include a first battery cell including a lithium cobalt oxide cathode material. The first battery cell may be electrically coupled with the one or more output terminals. The battery packs may include a second battery cell electrically coupled in parallel with the first battery cell. The second battery cell may be configured to operate in a voltage window maintained at or below about 4.0 V. The battery packs may also include a controller configured to receive a measured terminal voltage from the first battery cell during charging operations. The controller may also be configured to electrically disconnect the second battery cell from the first battery cell when the measured terminal voltage from the first battery cell exceeds a voltage threshold of the second battery cell. In some embodiments the controller may be configured to electrically connect the second battery cell with the first battery cell during discharging operations. The second battery cell may include as a cathode material lithium iron phosphate, lithium nickel manganese oxide, or lithium manganese oxide.

Such technology may provide numerous benefits over conventional technology. For example, the present battery packs may afford extended operation prior to regulation or shut down. Additionally, the battery packs may afford improved charging and discharging characteristics relative to conventional configurations. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1A:
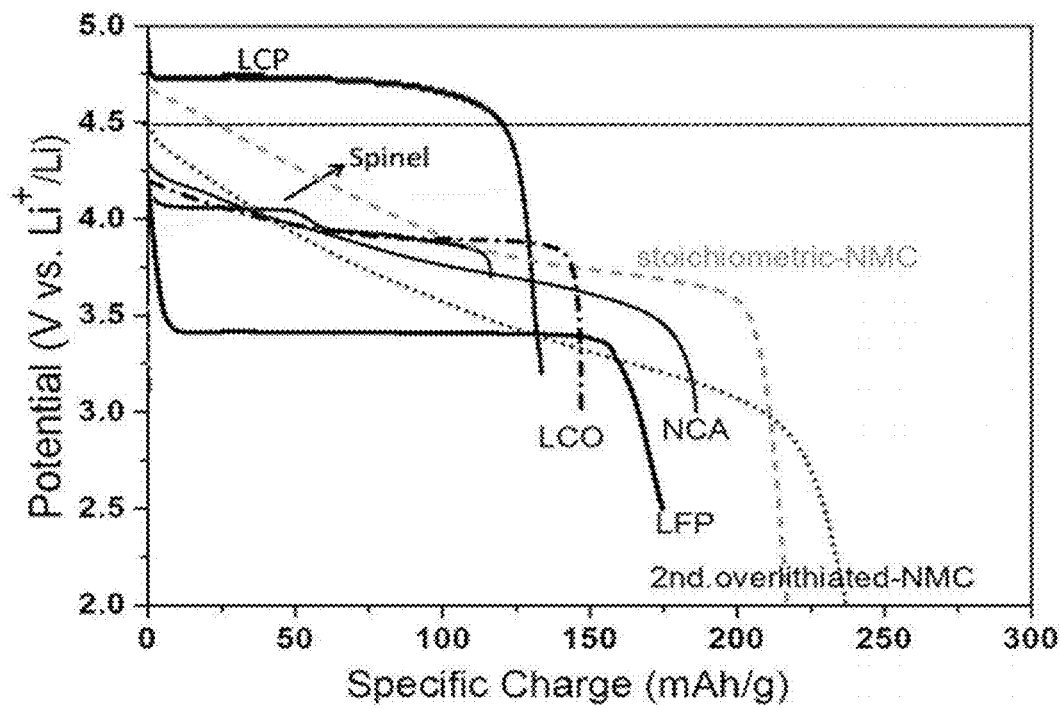
FIG. 1A shows a chart illustrating voltage profiles of materials for cathode electrodes for battery cells according to some embodiments of the present technology.

Several of the figures are included as schematics. It is to be understood that the figures are for illustrative purposes, and are not to be considered of scale or proportion unless specifically stated to be of scale or proportion. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cells may be designed with a balance of characteristics in mind. For example, including larger batteries may provide increased usage between charges. Similarly, including multiple battery cells within an enclosure may increase operational life for the device.

The operation of each individual battery cell may be affected by the chemistry or material properties of the materials within the cell. For example, different electrode materials may impact a voltage profile of a battery cell in operation, and may impact operation of battery packs in which the cells are incorporated. FIG. 1 illustrates a number of materials that may be incorporated in electrodes for a battery cell. For example, the materials may be included with a cathode electrode, and may produce a battery cell characterized by a specific voltage distribution as illustrated. As can be seen in the figure, different materials produce cells with different characteristics. For example, cathode materials including lithium cobalt oxide materials, shown as LCO in the chart, may be characterized by a relatively higher voltage potential, although the voltage curve is characterized by a slope over the operational range, followed by a relatively steep drop off in capacity. A benefit of this type of material is that it may operate effectively for higher volumetric energy density applications, although as will be explained below, impedance steadily increases during discharge.

Another exemplary material illustrated is lithium iron phosphate, shown as LFP in the chart, which may be characterized by a relatively flat voltage profile during discharge, although the material is characterized by a lower potential relative to other materials such as LCO. This material may be useful in high power applications where a lower voltage may be more acceptable, although as a main cell, the material may be less efficient for higher energy density relative to the space consumed by the cell. Other materials illustrated have advantages and disadvantages as well, and materials may be combined or modified in some applications to adjust properties of the battery cell.

Figure 1B:
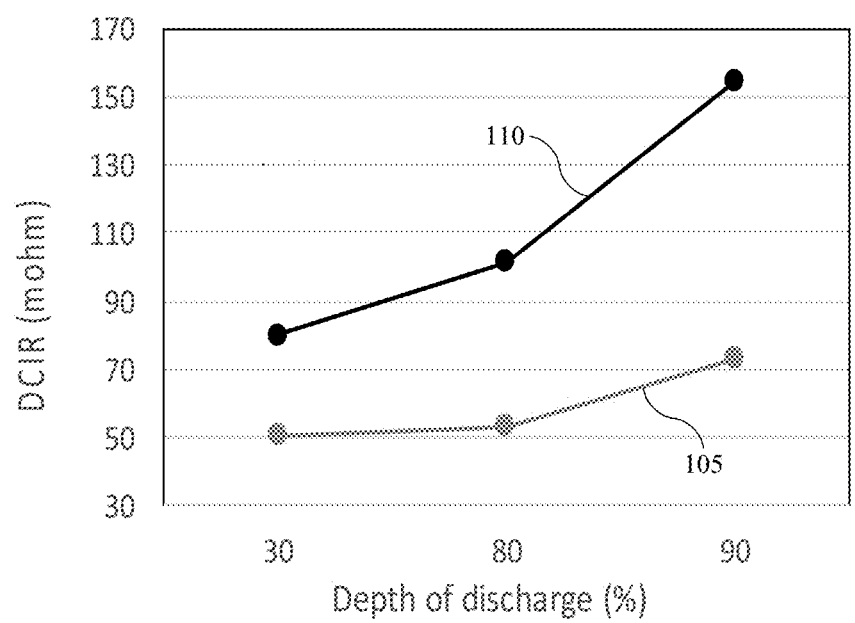
FIG. 1B shows a chart illustrating impedance dependence on depth of discharge for battery cells according to some embodiments of the present technology.

As noted, cobalt-containing cathode materials, such as LCO, may function well in many electronic devices due to the high volumetric energy density of the cell afforded by the characteristics of the LCO. However, as the battery cell or pack including one or more cells is further discharged, the impedance of the cell may increase, which may affect voltage and operation of the cell. FIG. 1B shows a chart illustrating impedance dependence on depth of discharge for battery cells according to some embodiments of the present technology. Line 105 is for a battery cell including a cobalt-containing material for the cathode electrode. The line shows how internal resistance of the battery cell increases as the battery cell is depleted. Line 110 shows the same cell after a number of charging and discharging cycles illustrating how resistance further increases over time. This resistance can cause the voltage of the cell to drop, which may trigger protective mechanisms in the cell.

For example, a cell including LCO or some other cobalt-containing material may provide desirable output voltage for operating an electronic device. As the cell depletes from use, the resistance may increase within the cell, and the voltage may reduce further for similar process current draws. If additional applications that may further draw current from the cell are enabled at this depth of discharge, the voltage may drop even faster at least in part due to the high impedance associated polarization. Protection circuits or mechanisms within the electronic device may be triggered based on the voltage drop caused by these circumstances at a greater depth of discharge, despite that the cell itself may still be characterized by 10-20% capacity remaining, or more. Including additional cells of the same material may reduce overall space within a designated form factor, or may create multiple cells having the same challenge.

The present technology overcomes these issues by incorporating a secondary cell including a separate electrode chemistry from the first cell. By utilizing a chemistry that may be characterized by lower potential but a flatter voltage profile, a battery pack including these two cell types may be characterized by extended discharge prior to shutdown, as well as additional advantages related to charging and discharging. A flatter voltage profile may be defined as less voltage variation during discharge. For example, as illustrated in FIG. 1A, some materials, such as LCO, may be characterized by a sloped voltage profile that may extend more than 5% of voltage, or more than 10% of voltage, between about 20% and about 80% of discharge. Additional materials, such as LFP, may be characterized by a relatively flat voltage profile, which may extend less than or about 5%, less than or about 3%, less than or about 2%, less than or about 1%, or may remain at stable voltage between about 20% and about 80% of discharge, or between about 10% and about 90% of discharge. This may allow the cell voltage to pin to the second battery cell as the first battery cell impedance increases, which may cause voltage to drop. Because the second cell may remain at a stable voltage for longer, the useful voltage range provided by the battery pack may increase without risking operation or performance of the cells.

Although the remaining portions of the description will reference lithium-ion batteries, it will be readily understood by the skilled artisan that the technology is not so limited. The present techniques may be employed with any number of battery or energy storage devices, including other rechargeable and primary battery types, as well as secondary batteries, or electrochemical capacitors. Moreover, the present technology may be applicable to batteries and energy storage devices used in any number of technologies that may include, without limitation, phones and mobile devices, watches, glasses, bracelets, anklets, and other wearable technology including fitness devices, handheld electronic devices, laptops and other computers, as well as other devices that may benefit from the use of the variously described battery technology.

Figure 2:
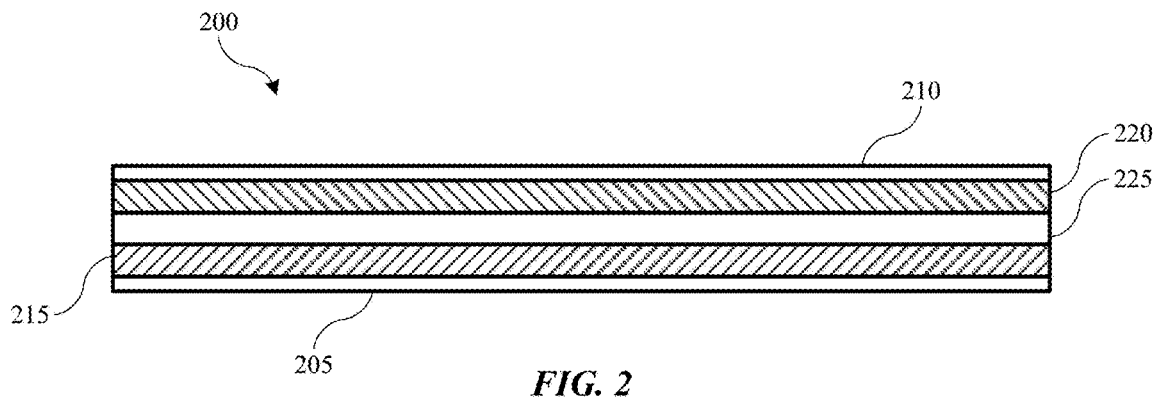
FIG. 2 shows a schematic cross-sectional view of a battery cell according to some embodiments of the present technology.

FIG. 2 depicts a schematic cross-sectional view of an energy storage device or battery cell 200 according to embodiments of the present technology. Battery cell 200 may be or include a battery cell, and may be one of a number of cells coupled together to form a battery structure. As would be readily understood, the layers are not shown at any particular scale, and are intended merely to show the possible layers of cell material of one or more cells that may be incorporated into an energy storage device. In some embodiments, as shown in FIG. 2, battery cell 200 includes a first current collector 205 and a second current collector 210. In embodiments one or both of the current collectors may include a metal or a non-metal material, such as a polymer or composite that may include a conductive material. The first current collector 205 and second current collector 210 may be different materials in embodiments. For example, in some embodiments the first current collector 205 may be a material selected based on the potential of an anode active material 215, and may be or include copper, stainless steel, or any other suitable metal, as well as a non-metal material including a polymer. The second current collector 210 may be a material selected based on the potential of a cathode active material 220, and may be or include aluminum, stainless steel, or other suitable metals, as well as a non-metal material including a polymer. In other words, the materials for the first and second current collectors can be selected based on electrochemical compatibility with the anode and cathode active materials used, and may be any material known to be compatible.

In some instances the metals or non-metals used in the first and second current collectors may be the same or different. The materials selected for the anode and cathode active materials may be any suitable battery materials operable in rechargeable as well as primary battery designs. For example, the anode active material 215 may be silicon, silicon oxide, silicon alloy, graphite, carbon, a tin alloy, lithium metal, a lithium-containing material, such as lithium titanium oxide (LTO), a combination of any of these materials, or other suitable materials that can form an anode in a battery cell. Additionally, for example, the cathode active material 220 may be a lithium-containing material. In some embodiments, the lithium-containing material may be a lithium metal oxide, such as lithium cobalt oxide, Lithium manganese oxide, lithium nickel manganese oxide, lithium nickel manganese cobalt oxide, lithium nickel cobalt aluminum oxide, lithium nickel cobalt manganese oxide, lithium nickel cobalt aluminum oxide, lithium titanate, or a combination of any of these materials, while in other embodiments the lithium-containing material can be a lithium iron phosphate, or other suitable materials that can form a cathode in a battery cell.

The first and second current collectors as well as the active materials may have any suitable thickness. A separator 225 may be disposed between the electrodes, and may be a polymer film, a ceramic membrane, or a material that may allow lithium ions to pass through the structure while not otherwise conducting electricity. Active materials 215 and 220 may additionally include an amount of electrolyte in a completed cell configuration, which may be absorbed within the separator 225 as well. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semi-metal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities, such as greater than or about $5^{-10}$ mS/cm.

Although illustrated as single layers of electrode material, battery cell 200 may be any number of layers. Although the cell may be composed of one layer each of anode and cathode material as sheets, the layers may also be formed into a jelly roll design, or folded design, prismatic design, or any form such that any number of layers may be included in battery cell 200. For embodiments that include multiple layers, tab portions of each anode current collector may be coupled together, as may be tab portions of each cathode current collector. Once the cell has been formed, a pouch, housing, or enclosure may be formed about the cell to contain electrolyte and other materials within the cell structure, as will be described below. Terminals may extend from or be coupled with the enclosure to allow electrical coupling of the cell for use in devices, including an anode and cathode terminal. The coupling may be directly connected with a load that may utilize the power, and in some embodiments the battery cell may be coupled with a control module that may monitor and control charging and discharging of the battery cell. FIG. 2 is included as an exemplary cell that may be incorporated in batteries according to the present technology. It is to be understood, however, that any number of battery and battery cell designs and materials that may include configurations described below similarly may be encompassed by or incorporated with the present technology.

Figure 3:
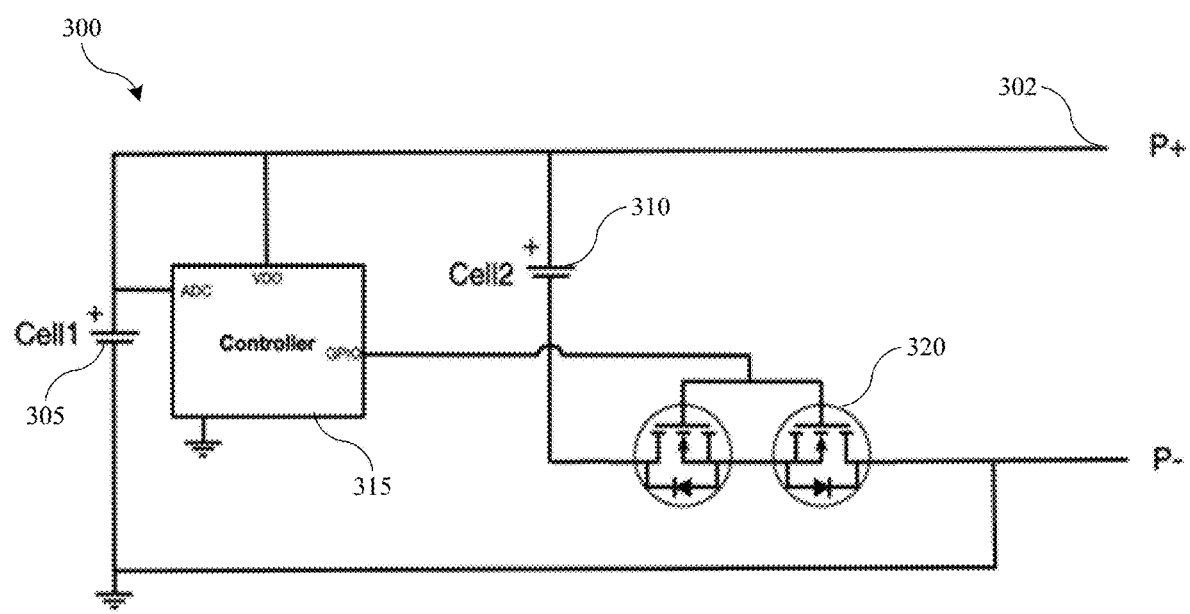
FIG. 3 shows a schematic diagram of a battery pack including two cells in parallel according to some embodiments of the present technology.

FIG. 3 shows a schematic diagram of a battery pack 300 including two cells in parallel according to some embodiments of the present technology. The configuration may couple the two cells in parallel to afford utilization of a first cell during a first period of time during discharge of the battery pack, and a second cell during a second period of time during discharge of the battery pack, which may be based on a load with which the cells or battery pack are coupled.

Battery pack 300 may have one or more output terminals 302, which may provide coupling with a load or electronic device. Battery pack 300 may include a first cell 305 and a second cell 310, one or both of which may be electrically coupled with the one or more output terminals 302. Each cell may represent one or more cells in some embodiments of the present technology, including multiple cells of different sizes or capacities. Either cell may include materials described previously, and may include any of the structures, components, or characteristics of battery cell 200 described above. In some embodiments, first cell 305 may be different from second cell 310 in one or more ways. For example, in some embodiments first cell 305 and second cell 310 may include one or more different materials, such as different electrode materials, from one another. The electrode materials may be selected in part based on the operation of the cell in the battery pack. For example, in some embodiments the first cell or cells may be sized larger than the second cell or cells, and may have materials selected for different purposes. The first cell 305 may operate as a main power source for an electronic device with which the battery pack is associated. Second cell 310 may operate as a secondary power source, which may operate in conjunction with the first cell 305 during operation of the battery pack.

In some embodiments the first cell 305 may include a lithium-containing material as the cathode electrode active material, and may include a cobalt-containing material. For example, first cell 305 may include lithium cobalt oxide in the cathode as discussed previously, although other cell materials described above may similarly be used. The first cell material may be selected to generally operate in a voltage window extending to greater than or about 3.5 V, and the material may be selected to operate within a voltage window extending to greater than or about 3.8 V, greater than or about 4.0 V, greater than or about 4.2 V, greater than or about 4.5 V, or higher. In some embodiments electrolyte chemistry may limit the operable voltage window to limit decomposition of electrolyte components. Hence, in some embodiments the operating voltage window for the first cell 305 may be less than or about 4.8 V, less than 4.5 V, or less. By utilizing materials, such as including lithium cobalt oxide, for example, first cell 305 may be developed for high volumetric energy density applications of an electronic device in which the battery pack may be incorporated. First cell 305 may also include one or more materials in the cathode that may be characterized by a cathode electrode density greater than or about 3 g/cc, and may be characterized by a cathode electrode density greater than or about 3.2 g/cc, greater than or about 3.5 g/cc, greater than or about 3.75 g/cc, greater than or about 3.85 g/cc, greater than or about 3.95 g/cc, or more.

Second cell 310 may be the same or different material than first cell 305, and in some embodiments may include a different cathode material than first cell 305. Second cell 310 may also include a lithium-containing material as the cathode electrode active material, although second cell 310 may not include lithium cobalt oxide in some embodiments. Second cell 310 may include one or more additional elements such as iron, nickel, or manganese in some embodiments. As non-limiting examples, second cell 310 may include cathode materials including lithium iron phosphate, lithium nickel manganese cobalt oxide, lithium manganese oxide, among other materials that may produce cells characterized by a flatter voltage profile. Second cell 310 may be configured to operate as a high power cell, which may operate after extended discharge of first cell 305. Consequently, second cell 310 may be characterized by a flatter voltage profile as previously described, which may also be characterized by lower impedance dependency on state of charge. Because second cell 310 may be operated in some embodiments subsequent an amount of discharge of first cell 305, corresponding to lower voltage from that cell, second cell 310 may be characterized by a lower operating voltage window than first cell 305. For example, second cell 310 may be characterized by a voltage window that may be below or about 4.0 V, and may be below or about 3.8 V, below or about 3.6 V, below or about 3.4 V, below or about 3.2 V, or less. Accordingly, in some embodiments the first cell 305 may be configured to operate in a voltage window extending between about 2.8 V and about 4.5 V, and the second cell 310 may be configured to operate in a voltage window extending between about 2.6 V and about 3.6 V, as well as smaller ranges within these stated ranges.

Second cell 310 may be any size in terms of capacity relative to first cell 305, although in some embodiments second cell 310 may be characterized by a lower capacity than first cell 305. First cell 305 may include materials that effectively operate with high volumetric energy density, and which may afford a reduced form factor for the first cell. Because second cell 310 may include materials characterized by a lower volumetric energy density than materials for first cell 305, and because second cell 310 may be configured to operate after an amount of discharge of first cell 305, second cell 310 may be sized at less than or about 50% of the capacity of first cell 305. In some embodiments second cell 310 may be sized at less than or about 45% of the capacity of first cell 305, less than or about 40% of the capacity, less than or about 35% of the capacity, less than or about 30% of the capacity, less than or about 25% of the capacity, less than or about 20% of the capacity, less than or about 15% of the capacity, less than or about 10% of the capacity, or less.

As illustrated in FIG. 3, first cell 305 and second cell 310 may be coupled in parallel within battery pack 300. Because second cell 310 may operate at a lower voltage window from first cell 305, a controller 315 may be coupled within the battery pack to control a connection and disconnection of second cell 310 from the parallel coupling with the first cell 305. Controller 315 may be electrically coupled with first cell 305, and may receive or may measure a terminal voltage from the first cell 305. Based on this measured terminal voltage, controller 315 may operate one or more switches, which may be one or more MOSFETS 320 as illustrated, or some other switch operable by controller 315, and which may disconnect or reconnect the second battery cell from the first battery cell.

During charging operations, the two parallel battery cells may charge in tandem up until a threshold voltage for the second battery cell indicating the second battery cell is fully charged. Because first cell 305 may not be fully charged, continued charging of the system may cause damage to second cell 310. By measuring a terminal voltage of the first battery cell, controller 315 may monitor the voltage to identify when the cell voltage may be increasing beyond the maximum voltage or a threshold voltage for the second cell. Consequently, controller 315 may disconnect the second battery cell from the first battery cell as well as from a power source when the measured terminal voltage from the first battery cell exceeds a voltage threshold of the second battery cell.

Controller 315 may reconnect the second cell 310 at any time after charging of first cell 305 has occurred. For example, subsequent charging, controller 315 may reconnect second cell 310 within the battery pack. Additionally, controller 315 may electrically connect the second battery cell with the first battery cell during discharging operations. For example, once discharge of the first battery cell to a load begins, controller 315 may reconnect second cell 310 within the battery pack. This reconnection may occur at any time during discharge, and may be related to a depth of discharge of the first battery cell as well. For example, in some embodiments the first cell cathode material may be or include lithium cobalt oxide, which as previously noted may be characterized by voltage decay during discharge, which may be at least in part based on increasing impedance. In some embodiments when the measured terminal voltage of the first battery cell during discharge is lowered to a threshold, second cell 310 may be reconnected into the system. This operation may occur at any measured voltage of the first cell. For example, second cell 310 may be recoupled when the measured voltage of the first cell reduces to less than or about 4.0 V. The second cell may also be recoupled when the measured voltage of the first cell reduces to less than or about 3.9 V, less than or about 3.8 V, less than or about 3.7 V, less than or about 3.6 V, less than or about 3.5 V, less than or about 3.4 V, less than or about 3.3 V, less than or about 3.2 V, less than or about 3.1 V, less than or about 3.0 V, or less.

Figure 4:
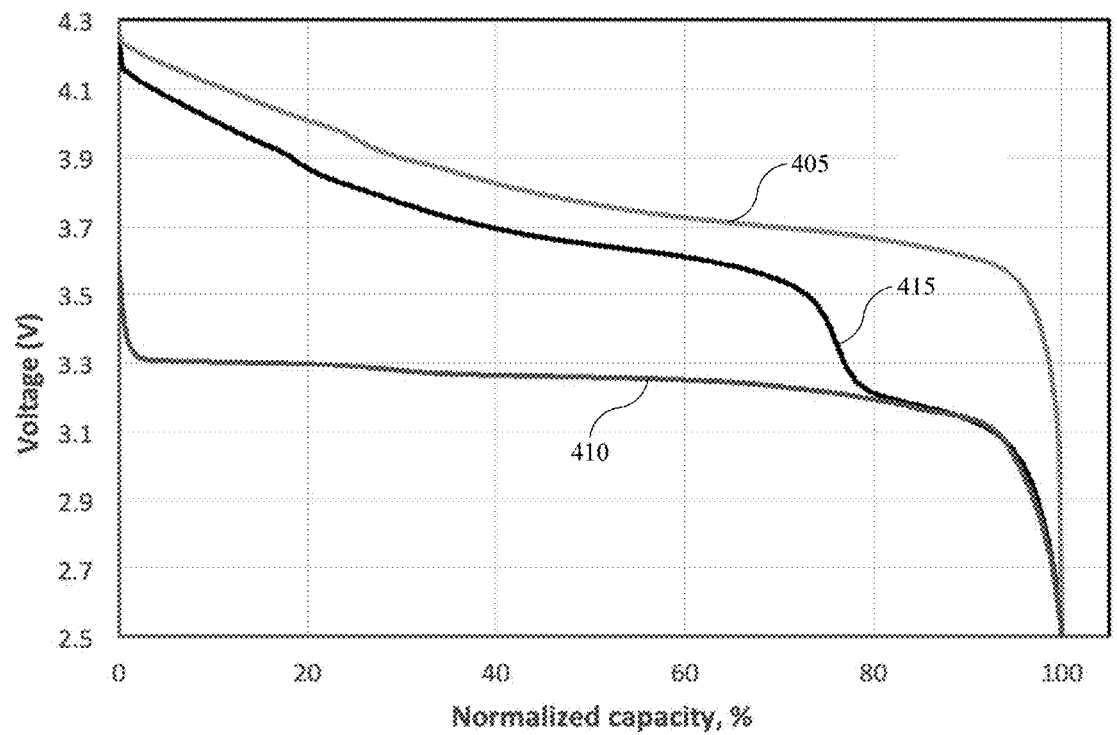
FIG. 4 shows a chart illustrating voltage profile for battery cells and a battery pack according to some embodiments of the present technology.

By utilizing a second cell as described in battery packs according to some embodiments of the present technology, extended operation and lower likelihood of premature device shutdown may occur. FIG. 4 shows a chart illustrating voltage profile for battery cells and a battery pack according to some embodiments of the present technology. The figure may illustrate one possible configuration encompassed by the present technology. The configuration is not intended to limit the scope of the claimed technology, and is merely intended to provide additional illustration of multi-cell configurations encompassed. Line 405 illustrates the voltage profile relative to capacity for an exemplary first cell according to some embodiments of the present technology. For example, line 405 is based on a 4.8 Ah energy cell including a lithium cobalt oxide cathode material. Line 410 illustrates the voltage profile relative to capacity for an exemplary second cell according to some embodiments of the present technology. For example, line 410 is based on a 1.1 Ah energy cell including a lithium iron phosphate cathode material. As shown, while line 405 is characterized by a sloping and reducing voltage profile as the cell discharges, due to material properties and increasing impedance as previously described, line 410 is characterized by a relatively flat voltage profile as the cell discharges.

Line 415 illustrates operation of a battery pack including both the first cell of line 405 and the second cell of line 410 coupled in parallel within the pack. As shown, during initial discharge of the battery pack, the voltage profile of the pack tracks and corresponds the profile of line 405 for the first cell. As the cell continues to discharge, and the voltage continues to decrease, the resistance may increase to a point that voltage drops to a threshold at which the first cell, the battery pack, or the electronic device incorporating the battery pack may otherwise shut down. However, instead of the battery pack shutting down as well, the pack voltage will follow the profile of the second cell of line 410, which may allow power delivery from the battery pack to continue longer than if the first cell was merely sized to a greater capacity.

Figure 5:
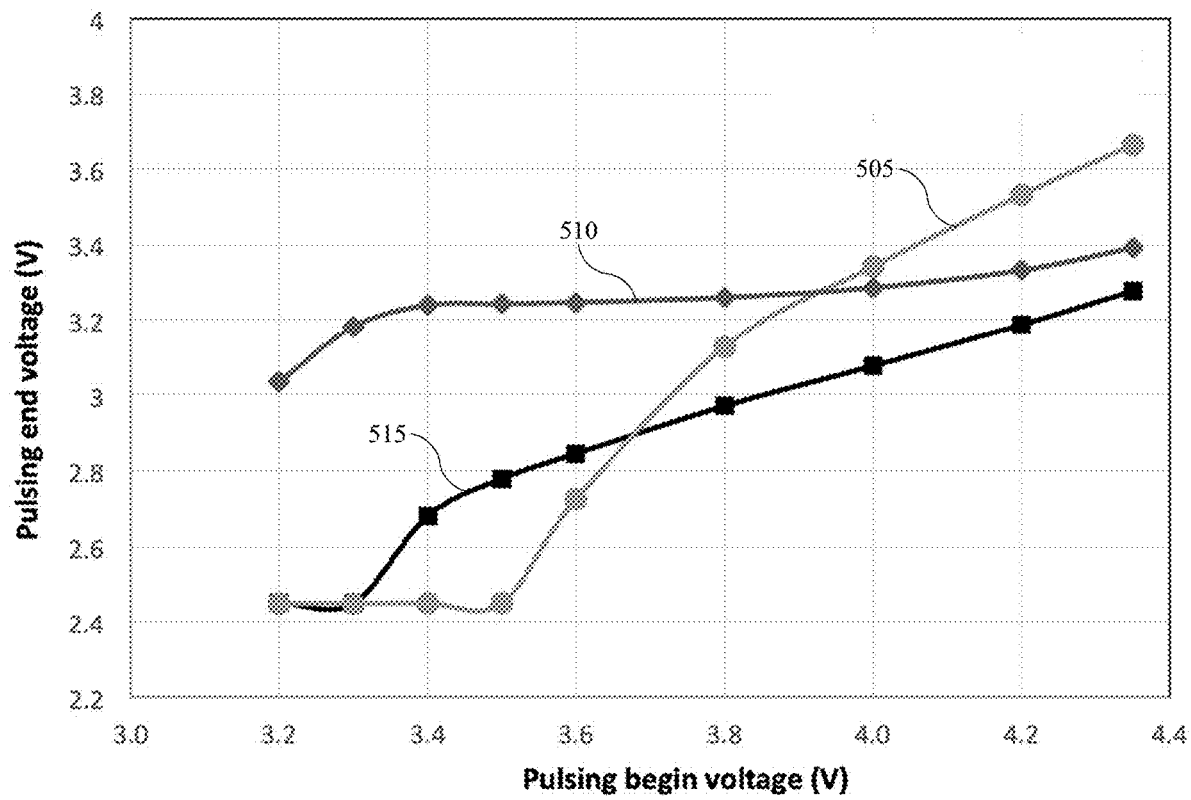
FIG. 5 shows a chart illustrating beginning and ending pulse profiles of battery cells and a battery pack according to some embodiments of the present technology.

FIG. 5 shows a chart illustrating beginning and ending pulse profiles of battery cells and a battery pack according to some embodiments of the present technology. The chart illustrates discharge of each of the battery cells and the parallel coupled battery pack at 2C rate for 30 seconds at 4.35 V, 4.2 V, 4.0 V, 3.8 V, 3.6 V, 3.5 V, 3.4 V, 3.3 V, and 3.2 V. Line 505 illustrates the discharge of a first cell as previously described, and is based on a 4.8 Ah energy cell including a lithium cobalt oxide cathode material. Line 510 illustrates the discharge of a second cell as previously described, and is based on a 1.1 Ah energy cell including a lithium iron phosphate cathode material. Line 515 illustrates the discharge of a battery pack having a first cell and second cell as described coupled in parallel. The voltages at beginning and end pulses are plotted as shown, and a cutoff voltage of 2.5 V is implemented as may be associated with operation of the battery pack in an electronic device.

For the high energy density first cell in which resistance increases as depth of discharge increases, when the pulsing voltage reaches 3.5 V or lower, the pulse end voltage reaches the cutoff voltage of 2.5 V, illustrating cell shutdown. However, this same shutoff may not occur with the second cell characterized by stable power delivery as illustrated. When the battery pack also includes a second cell coupled in parallel, the battery pack operational voltage continues to extend beyond the cutoff voltage of the first cell, and extends to about 3.3 V as illustrated. Again, this illustrates an improvement in discharge over a larger cell, such as a 6 Ah first cell, which may still reach cutoff voltage when the voltage reaches 3.5. By incorporating a second cell characterized by a flatter profile as described, operation of the battery pack can be extended beyond the capabilities of the first cell materials, while substantially maintaining the form factor and energy density benefits of utilizing the first cell materials.

As previously noted, one or more computing devices or components may be adapted to provide some of the desired functionality described herein by accessing software instructions rendered in a computer-readable form. The computing or processing devices may process or interpret signals from one or more of the components of the present technology, such as the controller, for example. When software is used, any suitable programming, scripting, or other type of language or combinations of languages may be used to perform the processes described. However, software need not be used exclusively, or at all. For example, some embodiments of the present technology described above may also be implemented by hard-wired logic or other circuitry, including but not limited to application-specific circuits. Combinations of computer-executed software and hard-wired logic or other circuitry may be suitable as well.

Some embodiments of the present technology may be executed by one or more suitable computing devices adapted to perform one or more operations discussed previously. As noted above, such devices may access one or more computer-readable media that embody computer-readable instructions which, when executed by at least one processor that may be incorporated in the devices, cause the at least one processor to implement one or more aspects of the present technology. Additionally or alternatively, the computing devices may comprise circuitry that renders the devices operative to implement one or more of the methods or operations described.

Any suitable computer-readable medium or media may be used to implement or practice one or more aspects of the present technology, including but not limited to, diskettes, drives, and other magnetic-based storage media, optical storage media, including disks such as CD-ROMS, DVD-ROMS, or variants thereof, flash, RAM, ROM, and other memory devices, and the like.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery pack comprising:
one or more output terminals;
a first battery cell comprising a lithium-containing material, wherein the first battery cell is configured to operate in a voltage window extending to or above about 4 V, and wherein the first battery cell is electrically coupled with the one or more output terminals;
a second battery cell electrically coupled in parallel with the first battery cell, wherein the second battery cell is configured to operate in a voltage window maintained between about 2.6 V and about 4.0 V; and
a controller configured to:
receive a measured terminal voltage from the first battery cell, and
determine whether to disconnect the second battery cell from the first battery cell based on the measured terminal voltage of the first battery cell.

2. The battery pack of claim 1, wherein the first battery cell is characterized by a cathode electrode density greater than or about 3.85 g/cc.

3. The battery pack of claim 2, wherein the first battery cell comprises a cathode electrode material comprising cobalt.

4. The battery pack of claim 1, wherein the second battery cell is characterized by a capacity of less than or about 25% of a capacity of the first battery cell.

5. The battery pack of claim 1, wherein the second battery cell comprises a lithium-containing cathode material including one or more of iron, nickel, or manganese.

6. The battery pack of claim 5, wherein the second battery cell comprises a lithium iron phosphate cathode electrode material.

7. The battery pack of claim 5, wherein the second battery cell comprises an anode material including graphite, titanium, or silicon.

8. The battery pack of claim 1, wherein the controller is further configured to:
monitor the measured terminal voltage from the first battery cell during charging; and
disconnect the second battery cell from the first battery cell when the measured terminal voltage from the first battery cell exceeds a voltage threshold of the second battery cell.

9. The battery pack of claim 1, wherein the controller is further configured to electrically connect the second battery cell with the first battery cell during discharging operations.

10. The battery pack of claim 9, wherein the controller is configured to connect the second battery cell with the first battery cell during discharging operations when the measured terminal voltage of the first battery cell is lower than or about a voltage threshold of the first battery cell.

11. A battery pack comprising:
a first battery cell comprising a lithium-cobalt cathode material, wherein the first battery cell is electrically coupled with an output terminal of the battery pack, wherein the first battery cell is configured to operate in a voltage window extending between about 2.8 V and about 4.5 V;
a second battery cell electrically coupled in parallel with the first battery cell, wherein the second battery cell comprises a cathode material different from the first battery cell, and wherein the second battery cell is characterized by a capacity less than or about 50% of the first battery cell; and
a controller configured to:
receive a measured terminal voltage from the first battery cell during charging operations, and
electrically disconnect the second battery cell from the first battery cell when the measured terminal voltage from the first battery cell exceeds a voltage threshold of the second battery cell.

12. The battery pack of claim 11, wherein the second battery cell is configured to operate in a voltage window extending between about 2.6 V and about 4.0 V.

13. The battery pack of claim 11, wherein the second battery cell comprises a lithium-containing cathode material including one or more of iron, nickel, or manganese.

14. The battery pack of claim 11, wherein the controller is further configured to electrically connect the second battery cell with the first battery cell during discharging operations.

15. The battery pack of claim 11, wherein the controller is configured to connect the second battery cell with the first battery cell during discharging operations when the measured terminal voltage of the first battery cell is lower than or about a voltage threshold of the first battery cell.

16. A battery pack comprising:
one or more output terminals;
a first battery cell comprising a lithium cobalt oxide cathode material, wherein the first battery cell is electrically coupled with the one or more output terminals;

a second battery cell electrically coupled in parallel with the first battery cell, wherein the second battery cell is configured to operate in a voltage window maintained at or below about 4.0 V; and a controller configured to:

receive a measured terminal voltage from the first battery cell during charging operations, electrically connect the second battery cell with the first battery cell during discharging operations, and electrically disconnect the second battery cell from the first battery cell when the measured terminal voltage from the first battery cell exceeds a voltage threshold of the second battery cell.

17. The battery pack of claim 16, wherein the second battery cell comprises as a cathode material lithium iron phosphate, lithium nickel manganese oxide, or lithium manganese oxide.

* * * * *